United States Patent
Kishi

(10) Patent No.: US 9,892,136 B2
(45) Date of Patent: Feb. 13, 2018

(54) METHOD AND SYSTEM FOR SCRUBBING DATA WITHIN A DATA STORAGE SUBSYSTEM

(71) Applicant: INTERNATIONAL BUSINESS MACHINES CORPORATION, Armonk, NY (US)

(72) Inventor: Gregory T. Kishi, Oro Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/932,557

(22) Filed: Nov. 4, 2015

(65) Prior Publication Data

US 2016/0062824 A1    Mar. 3, 2016

Related U.S. Application Data

(63) Continuation of application No. 14/261,839, filed on Apr. 25, 2014, now Pat. No. 9,208,182, which is a continuation of application No. 11/087,027, filed on Mar. 22, 2005, now Pat. No. 8,745,011.

(51) Int. Cl.
   *G06F 17/30*    (2006.01)
   *G06F 11/10*    (2006.01)
   *G06F 3/06*     (2006.01)
   *G06F 12/0866*  (2016.01)

(52) U.S. Cl.
   CPC ........ *G06F 17/30303* (2013.01); *G06F 3/064* (2013.01); *G06F 3/0619* (2013.01); *G06F 3/0683* (2013.01); *G06F 11/106* (2013.01); *G06F 12/0866* (2013.01)

(58) Field of Classification Search
   CPC .................. G06F 17/30303; G06F 11/106
   USPC ............................... 707/692; 714/764
   See application file for complete search history.

(56) References Cited

U.S. PATENT DOCUMENTS

| | | | |
|---|---|---|---|
| 5,446,741 A | 8/1995 | Boldt et al. | |
| 5,632,012 A | 5/1997 | Belsan et al. | |
| 5,751,947 A * | 5/1998 | Arakawa | G11B 20/1883 |
| | | | 714/54 |
| 6,029,179 A | 2/2000 | Kishi | |
| 6,073,221 A | 6/2000 | Beal et al. | |
| 6,085,298 A | 7/2000 | Ohran | |
| 6,247,096 B1 | 6/2001 | Fisher et al. | |
| 6,349,390 B1 | 2/2002 | Dell et al. | |
| 6,493,709 B1 | 12/2002 | Aiken | |
| 6,567,811 B1 | 5/2003 | Edwards et al. | |
| 6,973,654 B1 | 12/2005 | Shutt et al. | |
| 2002/0078396 A1 | 6/2002 | Murphrey et al. | |
| 2002/0162075 A1 | 10/2002 | Talagala et al. | |

(Continued)

*Primary Examiner* — Thu-Nguyet Le
(74) *Attorney, Agent, or Firm* — Griffiths & Seaton PLLC

(57) ABSTRACT

Various embodiments for scrubbing data within a data storage subsystem are disclosed. According to one embodiment, a method is provided for scrubbing data of a storage element within a data storage subsystem, the method comprising: selecting a storage element from the plurality of storage events; determining that a quantity of active data has reached a predetermined quantity threshold; and temporarily suspending data modifications on a portion of the selected storage element while maintaining read access to the selected storage element in response to the determination.

17 Claims, 6 Drawing Sheets

(56) References Cited

U.S. PATENT DOCUMENTS

| | | |
|---|---|---|
| 2003/0097608 A1 | 5/2003 | Rodcheffer et al. |
| 2003/0135794 A1 | 7/2003 | Longwell et al. |
| 2003/0142101 A1 | 7/2003 | Lavelle et al. |
| 2003/0167440 A1* | 9/2003 | Cavanna ............ H03M 13/617 714/781 |
| 2004/0039972 A1 | 2/2004 | Chung |
| 2005/0028048 A1* | 2/2005 | New ................... G06F 11/1076 714/54 |
| 2005/0154582 A1 | 7/2005 | Kortenoeven et al. |
| 2005/0198450 A1 | 9/2005 | Corrado et al. |
| 2005/0268022 A1* | 12/2005 | Pelley ................. G11C 7/1042 711/5 |
| 2005/0289436 A1* | 12/2005 | Redford ................ G11C 29/56 714/758 |
| 2006/0031268 A1 | 2/2006 | Shutt et al. |
| 2006/0010301 A1 | 6/2006 | Yagawa |
| 2006/0155944 A1 | 7/2006 | Kano |
| 2007/0088923 A1 | 4/2007 | Armstrong-Crews et al. |

* cited by examiner

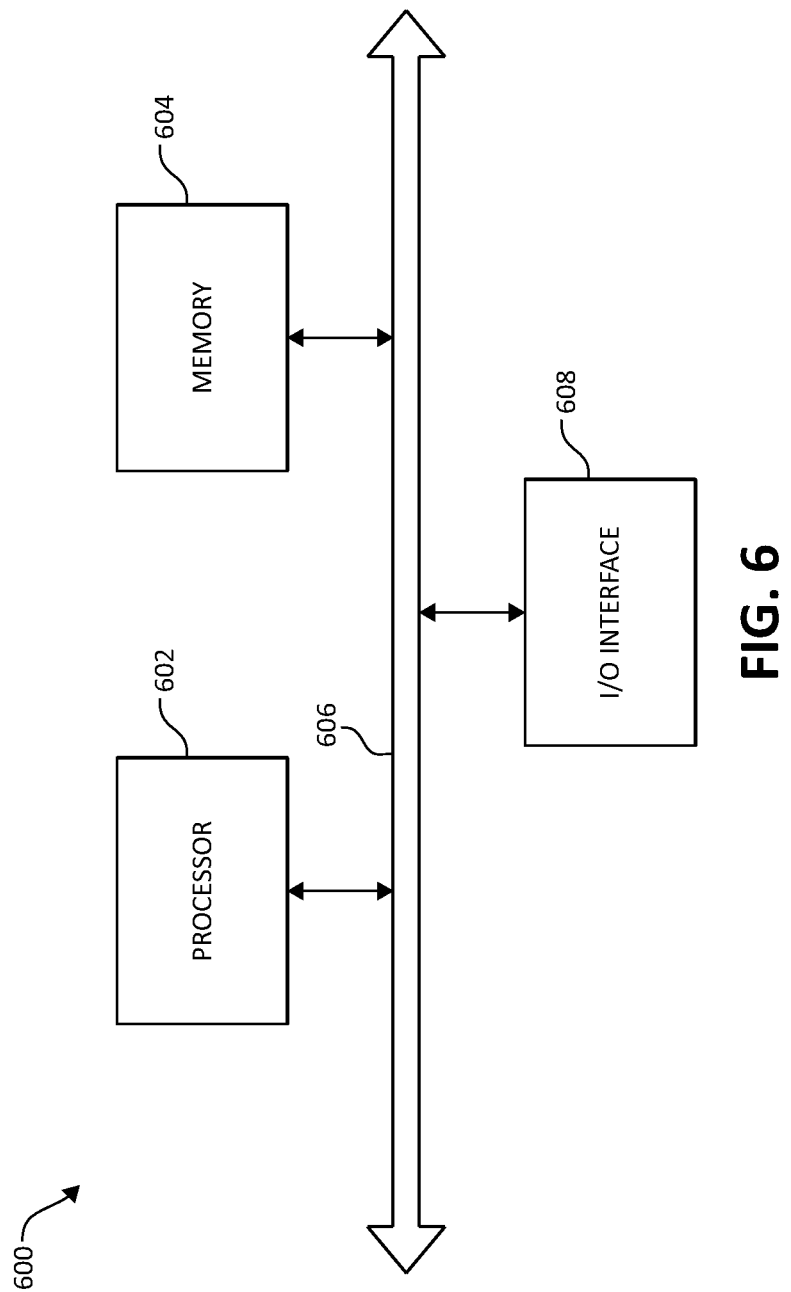

METHOD AND SYSTEM FOR SCRUBBING DATA WITHIN A DATA STORAGE SUBSYSTEM

CROSS-REFERENCE TO RELATED APPLICATIONS

This application is a Continuation of U.S. patent application Ser. No. 14/261,839, filed Apr. 25, 2014, which is a Continuation of U.S. patent application Ser. No. 11/087,027, now U.S. Pat. No. 8,745,011, filed on Mar. 22, 2005, the contents of both are incorporated herein by reference.

BACKGROUND

Field of the Invention

Embodiments of the present invention relate generally to data storage and management and more particularly to a method and system for scrubbing data within a data storage subsystem.

Description of the Related Art

Recently, enterprises have become more dependent on the ability to store, organize, manage and distribute data. Accordingly, "information lifecycle management," the process of managing business data from conception until disposal in a manner that optimizes storage, access, and cost characteristics has become increasingly important. One important facet of information lifecycle management is the processes and mechanisms by which the validity of data may be determined, and, where invalid data is discovered, by which such invalid data may optionally be corrected or discarded. The process of validating (and in some cases correcting invalid data) is typically referred to as "data scrubbing."

Data scrubbing may be implemented using any of a number of techniques or methods. Using error-correcting code (ECC) for example, each group of data is stored along with metadata describing the bit sequence of the group. When a group of data is subsequently accessed, the metadata may be recalculated and compared to the previously-stored metadata to determine if an error is present and, in some cases (e.g., where a so-called "soft error" has occurred) which bit(s) need to be modified to correct the error(s). Data scrubbing may be provided on various levels within a data storage subsystem and may be implemented in hardware, software, or a combination thereof.

To ensure that data being scrubbed is in a consistent state during validation, data to be scrubbed may not typically be accessed directly while a scrubbing operation is being performed. Consequently, a redundant (e.g., cached) copy of the data to be scrubbed is provided for access, or alternatively all access to the data to be scrubbed is simply suspended, during data scrubbing operations in conventional data storage subsystems. While redundant storage or caching techniques enable data access to continue while a data scrub is performed, such caches are an additional expense and may not be feasible to implement due to increased complexity and/or size constraints. By contrast, data scrubbing techniques which rely on the complete cessation of data access typically add nominal or no expense to a data storage subsystem but can significantly increase the latency with which data may be accessed.

System administrators frequently make copies of logical volumes, for example in order to perform backups or to test and validate new applications. Such copies are commonly referred to as snapshots.

SUMMARY OF THE INVENTION

Various embodiments for scrubbing data within a data storage subsystem are disclosed. According to one embodiment, a method is provided for scrubbing data of a storage element within a data storage subsystem, the method comprising: selecting a storage element from the plurality of storage events; determining that a quantity of active data has reached a predetermined quantity threshold; and temporarily suspending data modifications on a portion of the selected storage element while maintaining read access to the selected storage element in response to the determination.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which:

FIG. 6 illustrates a data processing system useable with one or more embodiments of the present invention.

The use of the same reference symbols in different drawings indicates similar or identical items.

DETAILED DESCRIPTION OF THE DRAWINGS

Figure 1:
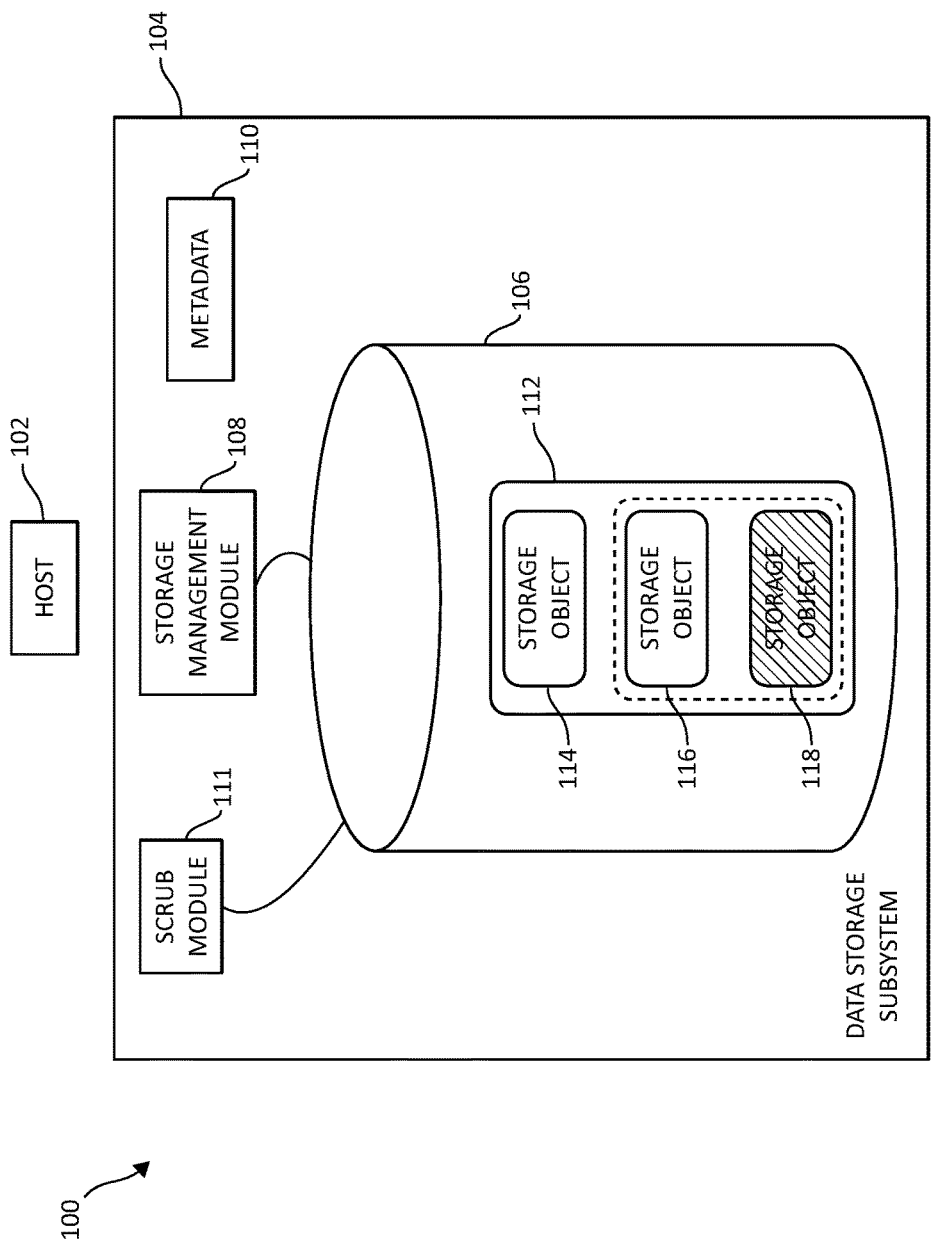
FIG. 1 illustrates a high level block diagram of a data storage network including a data storage subsystem according to an embodiment of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method and system for scrubbing data such as reference data within a data storage subsystem. Reference data may include any data utilized in conjunction with an enterprise (e.g., internal reporting structures, counterparty data, instrument data, product and market data, rating and industry classification schemes, or the like). In one or more embodiments of the present invention, an exhaustive scrub operation is performed which scrubs (i.e., validates) all data of a storage element such as a logical storage volume including active as well as inactive or "latent" data. Such latent or inactive data may include, for example, copies of data which have been relocated or duplicated at one or more locations within a storage element via data storage subsystem entities (e.g., files systems, volume or storage managers, data replicators, or the like).

Embodiments of the present invention may be implemented in a distributed environment, for example, where storage element management including the processing of storage element creation, deletion and/or access (e.g., read/write) requests is performed using a first processing module (e.g., a processing device or software module) while a data scrub process as described herein is performed using a second, alternate processing module. According to one embodiment of the present invention, access permission metadata associated with data to be scrubbed is modified to designate the data as "read-only" such that read access may be provided substantially simultaneously with the performance of a data scrub operation. Such data scrub operations may be performed continuously or initiated upon the occurrence of an event (e.g., a determination that disk or data storage subsystem utilization has fallen below a predetermined or dynamically adjusted threshold value).

FIG. 1 illustrates a high level block diagram of a data storage network including a data storage subsystem according to an embodiment of the present invention. In the depicted data storage network 100, a host 102 is coupled to a data storage subsystem 104 via a communication channel or link. Data storage subsystem 104 of the illustrated embodiment includes storage 106 (e.g., made up of one or more physical storage devices or media) coupled with separate processing modules used at least for storage management (e.g., storage management processing module 108) and for performing a data scrub process (e.g., data scrub processing module 111) as shown. In alternative embodiments of the present invention, such processes or actions may be performed using a greater or lesser number of processing modules. For example, a single processing module may be utilized to accomplish both storage management and scrubbing operations according to one embodiment.

Processing modules as illustrated in FIG. 1 and described herein may be implemented using separate processors or processing cores of a high-availability processor subsystem or alternatively using a single processor core within a uni or multi-processor system. Storage 106 of the illustrated data storage subsystem 104 includes one or more storage elements (e.g., storage element 112) each capable of storing data within one or more storage objects (e.g., storage objects 114, 116 and 118). A storage element may include any logical or physical entity used to store data. In one embodiment of the present invention, each storage element represents a logical storage volume (e.g., a logical storage container, unit, or entity as defined by an operating system, file system, storage management hardware or software, storage device or appliance).

More specifically, in one embodiment of the present invention a storage element comprises a Tivoli Storage Manager (TSM) volume or storage pool as defined by the Tivoli Storage Manager application provided by International Business Machines Corporation of Armonk, N.Y. and further described herein with respect to FIGS. 5A-5D. A storage element (e.g., a TSM volume) may also be hierarchically stored within one or more other logical and/or physical storage elements. Similarly, a storage object may include any logical data storage container, unit, or entity to which access may be controlled and/or usage of which may be restricted to a specific subject or group or class of subjects. According to various embodiments of the present invention, a storage object may include a file, a data structure, a storage page, word, byte, block, or the like.

In the data storage network 100 of FIG. 1, data is stored within storage elements (e.g., storage element 112) using a storage management processing module 108. In the illustrated embodiment, the manner in which data is stored is monitored using metadata 110 maintained or used by storage management processing module 108. Storage element 112 of data storage subsystem 104 includes two active data objects (storage objects 114 and 116) and one inactive storage object (storage object 118).

Active and inactive storage objects such as storage objects 116 and 118 may be associated with one another. For example, storage object 118 may be a duplicate of storage object 116 (e.g., may include data which duplicates data of storage object 116) created for parallel access, incremental change tracking, or retained following movement of storage object 116 due to a space reclamation or other system process. Storage object 118 may also include other data associated with storage object 116 (e.g., metadata regarding storage object 116) while not duplicating any portion of storage object 116 explicitly.

Inactive data (e.g., data stored within storage object 118) in data storage network 100 may or may not be indexed (e.g., using metadata 110) depending on system parameters or configuration. Consequently, such inactive data may or may not be tracked or "visible" to storage management processing module 108 or other systems elements. In embodiments of the present invention, all data (active or inactive, indexed or non-indexed) of a selected storage element (e.g., storage element 112) is scrubbed during a scrubbing process or operation. According to one embodiment, scrubbing may be performed at a raw storage (e.g., block) or file system level using any of a number of techniques. Techniques used for data or storage element scrubbing may be user or host-selectable or automatically determined.

As a separate processing module (data scrub processing module 111) is utilized and scrubbing is performed at a lower level of abstraction than ordinary data access (e.g., read and write operations performed by storage management processing module 108), data scrubbing may be performed without requiring interaction with storage management processing module 108, metadata 110, or host 102. In various embodiments of the present invention, data scrub processing module 111 may perform operations autonomously or may request or cause storage management processing module 108 or other system elements to perform operations on its behalf (e.g., opportunistically).

According to one embodiment of the present invention, modifications of data within storage element 112 are suspended while data of storage objects 114-118 are validated to ensure that no updates (e.g., write operations, or other data or metadata changes) are lost and to maintain data consistency. For example, access permission metadata (e.g., an access permission flag, bit, or other indicator) may be modified in order to render or designate all or a relevant portion of storage element 112 "read-only."

In one embodiment of the present invention, any requested updates (e.g., write operations) occurring during a data scrub operation may be resubmitted via a host or application once permission to modify a storage element storing the corresponding data is established. Alternatively, updates may be temporarily stored or queued (e.g., by data scrub processing module 111 or storage management processing module 108) or applied to a proxy storage element and later applied or coalesced to an appropriate storage element, object, or data thereof. Consequently, data of a data storage element to be scrubbed (e.g., storage element 112) may be accessed or read and scrubbed during the same interval of time while remaining in a consistent state.

Figure 2:
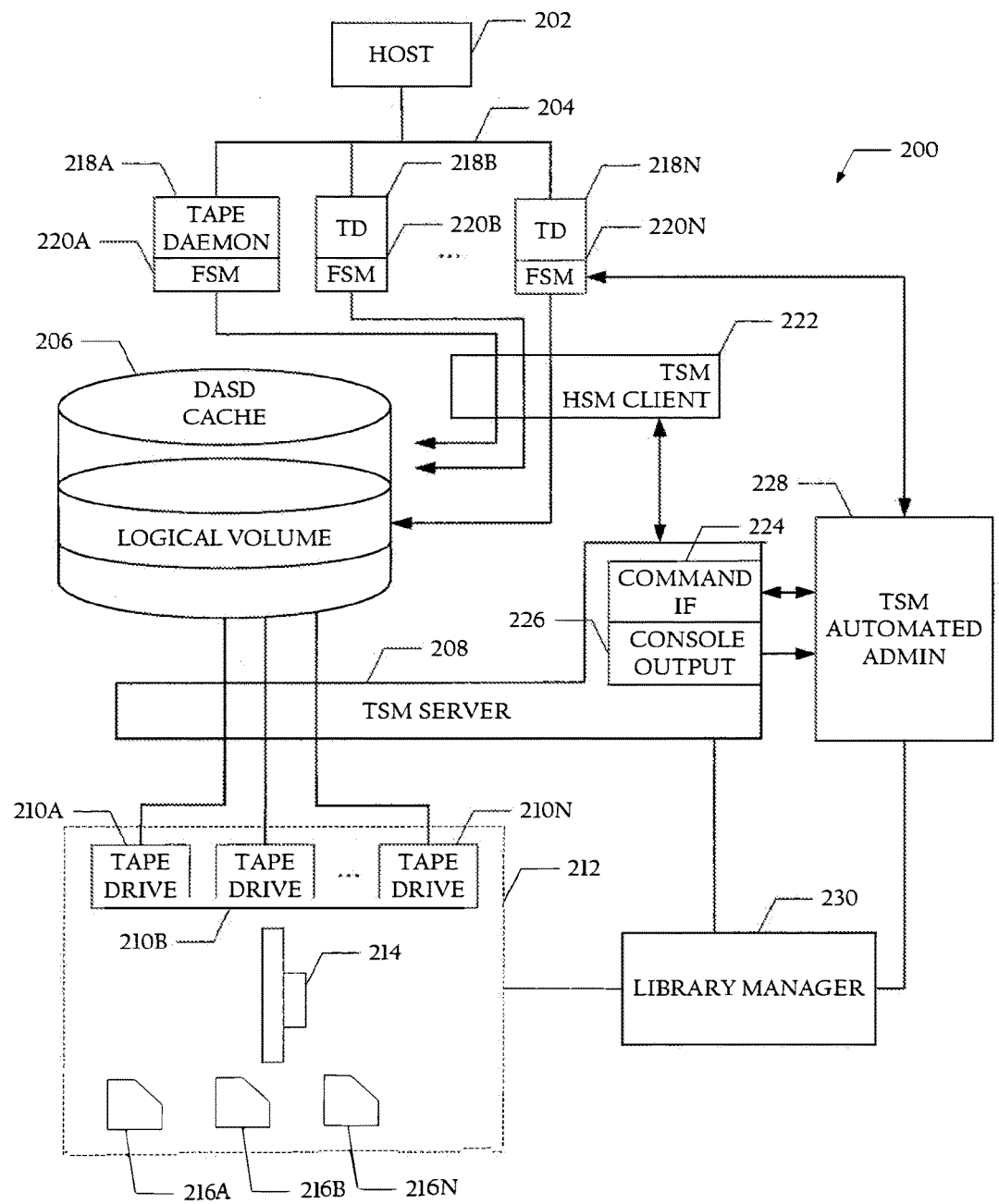
FIG. 2 illustrates a more detailed block diagram of a data storage network including a data storage subsystem according to an embodiment of the present invention.

FIG. 2 illustrates a more detailed block diagram of a data storage network 200 including a data storage subsystem according to an embodiment of the present invention. In the illustrated data storage network, a host 202 is shown communicatively coupled to a data storage subsystem via a host-to-data interface 204. Host-to-data interface 204, such as IBM's Enterprise Systems Connection (ESCON), may be a fiber optic local area network used to link mainframes to disk drives, other mainframes, or other storage devices. Data storage network 200 of the embodiment of FIG. 2 is implemented using a virtual tape system or server (VTS). A virtual tape system is a special storage device or group of devices and software which manages data such that the data appears to be stored entirely on tape cartridges when some portions may actually be located in faster, hard disk storage.

Programming for a virtual tape system is sometimes referred to as a virtual tape server although these terms may be used interchangeably unless otherwise specifically indicated. A virtual tape system may be used with a hierarchical storage management (HSM) system in which data is moved as it falls through various usage thresholds to slower but less costly forms of storage media. A virtual tape system may also be used as part of a storage area network (SAN) where less-frequently used or archived data can be managed by a single virtual tape server for a number of networked computers.

In the embodiment of FIG. 2, a virtual tape system includes a DASD (e.g., hard disk drive) cache 206 including one or more logical volumes; a storage management processing module (composed, in the illustrated embodiment, of a storage management server 208 and a hierarchical storage management (HSM) client 222); and a plurality of tape storage devices 210A, 210B, . . . 210N coupled with an automated library 212. Tape storage drives 210 are serviced by an accessor (e.g., a robot) 214 which transfers selected tape cartridges 216A, 216B, . . . 216N between tape storage drives 210 and their corresponding positions within a tape cartridge repository. In depicted automated library 212, accessor 214 may be controlled using a library manager 230 based upon inputs received from storage management server 208 and/or automated storage management administrator 228. From the perspective of host 202, tape daemons 218A, 218B, . . . 218N may appear as multiple tape storage drives attached to host-to-data interface, or ESCON, 204.

Host-to-DASD cache data transfer in the illustrated virtual tape data storage subsystem may be controlled by VTS code via hierarchical storage management (HSM) client 222. For example, in one embodiment host-to-DASD cache data transfer is directly controlled by a file system manager (FSM) 220A, 220B, . . . 220N which handles DASD read and write commands. Similarly, a DASD cache 206-to-tape storage drive 210 interface may be controlled by storage management server 208. One example of a storage management processing module which could be used as storage management server 208 and HSM client 222 is the Tivoli Storage Manager (TSM) application provided by International Business Machines Corporation of Armonk, N.Y. In depicted data storage network 200, storage management server 208 includes a command interface 224 and a console output 226.

According to one embodiment, automated storage management administrator 228 provides functionality needed to achieve the data scrub process of the present invention, and additionally performs many VTS specific administrative functions using storage management server 208. For example, automated storage management administrator 228 may include a data scrub processing module as previously described herein.

Figure 3:
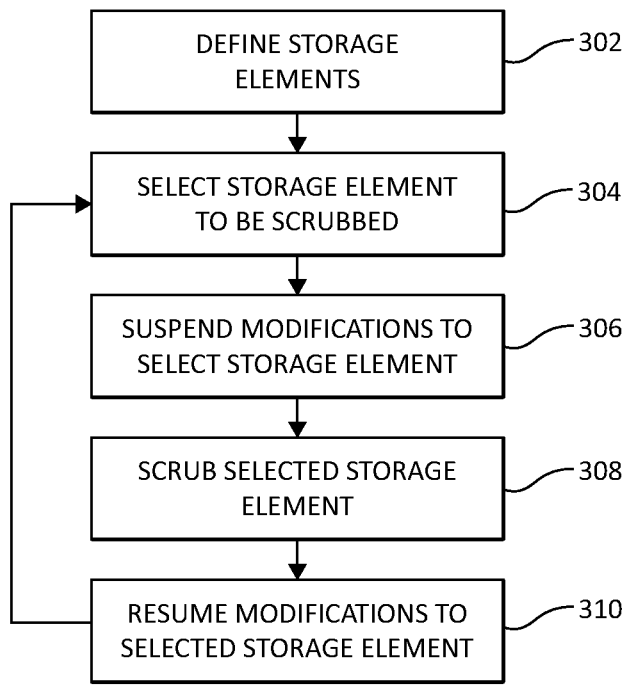
FIG. 3 illustrates a high-level flow diagram of a data scrub process according to an embodiment of the present invention.

FIG. 3 illustrates a high-level flow diagram of a data scrub process according to an embodiment of the present invention. In the illustrated process embodiment, a plurality of storage elements (e.g., logical volumes) are initially defined (process block 302). A storage element may be defined by creating or updating metadata indicating or specifying the attributes of the storage element (e.g., a reference or address map indicating, if necessary, the relationship between a "logical" storage element and a corresponding physical storage element or device). Such definition may be performed using an operating or file system element or additional (e.g., storage management) software elements. In alternative embodiments of the present invention, storage elements may be hierarchically defined. For example, a TSM-defined logical volume may be defined for or "mounted" on a storage device, file or operating system-defined logical volume as is depicted and described with respect to FIGS. 5A-5D.

Once the storage elements have been defined, a storage element including data to be scrubbed is selected (process block 304). Storage element selection may be based upon any of a number of parameters in alternative embodiments of the present invention. For example, a storage element having the greatest amount of active data to be scrubbed (e.g., total number of bytes or blocks) may be selected. According to one embodiment of the present invention a predetermined threshold quantity of data to be scrubbed is defined and the first storage element to accumulate that volume of data causes the illustrated data scrub process to be initiated automatically and that storage element to be selected.

Alternatively, a storage element having the greatest (or least) frequency of access may be selected. Where a most-frequently accessed storage element is selected for scrubbing, the validity of data which is most-frequently accessed (and therefore most likely to cause additional data or system errors) may be ascertained. Errors discovered in such data may be corrected to improve overall data storage and processing system operation. Where a least-frequently accessed storage element is selected by contrast, the fewest number of data updates (e.g., write operations) may be disturbed. In other embodiments of the present invention, storage element selection may be based on a more specific analysis of read and/or write frequency.

After a storage element has been selected, modifications to that storage element are suspended (e.g., by designating that storage element or a portion thereof read-only) (process block 306). Data of the selected storage element is then scrubbed (process block 308) using one or more scrubbing operations such as illustrated and described herein with respect to FIG. 4. In embodiments of the present invention, data scrubbing may include the validation of data alone (i.e., the identification of any data errors) or may include the validation and correction of the data being scrubbed. Following the scrubbing of the selected storage element, modifications (e.g., write operations) to the selected storage element may be resumed (process block 310) and the illustrated process embodiment may be continued via the selection of another storage element for scrubbing.

Figure 4:
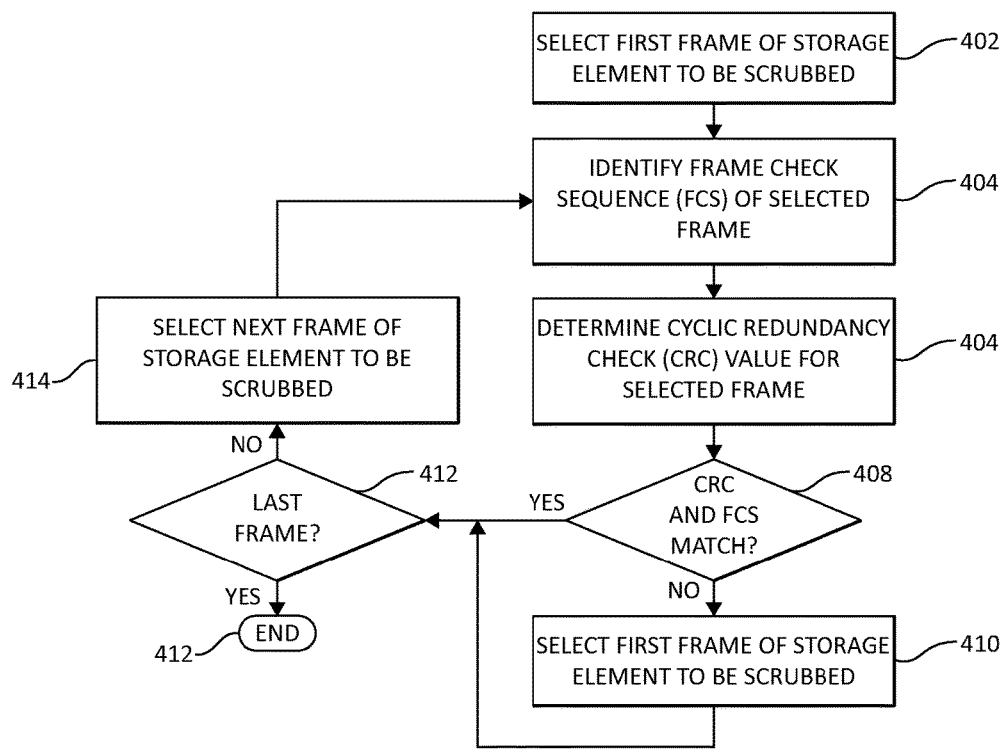
FIG. 4 illustrates a flow diagram of a data scrub operation according to an embodiment of the present invention.

FIG. 4 illustrates a flow diagram of a data scrub operation according to an embodiment of the present invention. In various alternative embodiments of the present invention, a data scrub operation may be implemented using any of a number of techniques or methods. In the embodiment depicted in FIG. 4, a cyclic redundancy check or code (e.g., CRC 16 or CRC 32) technique is shown. In other embodiments of the present invention, various other error detection or detection and correction algorithms (e.g., checksums) may be used such as the message digest (MD) algorithm (e.g., MD4 or MD5 and their variants).

In the illustrated process embodiment, the first frame of a storage element to be scrubbed is initially selected (process block 402). Although the term "frame" has been used herein with respect to subdivisions of a storage element, in alternative embodiments of the present invention sub-elements of different granularity or nomenclature may be used. Thereafter, a frame check sequence (FCS) or other checksum-type value of the selected frame is identified (process block 404). A cyclic redundancy check (CRC) is then performed to generate a CRC value for the selected frame (process block 406). The CRC value is then compared to the identified FCS value to determine whether or not the two values match (process block 408).

In alternative embodiments of the present invention, the form of comparison (e.g., between the CRC and FCS values) used varies depending on the particular validation scheme implemented. For example, the two values may be compared directly to determine whether or not they are identical, or one value may be divided into another value to determine whether a zero remainder is produced. If a determination is made that the CRC and FCS values do not "match" utilizing the appropriate comparison technique, an error for the selected frame (or alternatively for the entire storage element) is indicated (process block 410) (e.g., via a notification to an appropriate system element, modification of a portion of metadata associated with the storage element or frame, or the like).

Following an indication of an error or a "match" determination for the CRC and FCS values, another determination is made whether or not the current frame (or other sub-component) of the storage element being scrubbed is the final frame, sequentially, of the storage element (process block 412). Where a determination is made that the final frame has been scrubbed, the illustrated process is concluded as shown. Otherwise, the next sequential frame of the storage element to be scrubbed is selected (process block 414) and an operational loop, formed from a portion of the illustrated process, is entered (indicated as beginning at process block 404) until all frames of the selected storage element have been processed.

Although the flow diagrams depicted in FIG. 3 and FIG. 4 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, additional process operations may be added where necessary in alternative embodiments of the present invention. For example, although the illustrated process embodiment depicts only the validation (i.e., the identification of detection of the presence of one or more errors) error correction operations may be included in alternative embodiments of the present invention.

FIGS. 5A-5D illustrate a high level block diagram of a storage address space over time as a data scrub process according to an embodiment of the present invention is applied. Address space 500 depicted in FIGS. 5A-5D includes a number, "N", of storage elements (e.g., logical volumes 502A, 502B, 502C, . . . 502N). Throughout the present description, the variable "N" has been used to designate a positive integer number of elements. It should be appreciated that although the same variable has been used in all instances, a uniform number of each of the associated elements is not required. For example, although FIG. 2 depicts "N" file system managers, tape storage devices, and tape cartridges, each group may include any number of elements. Similarly, any number of logical volumes as illustrated in FIGS. 5A-5D may be utilized with various embodiments of the present invention.

Figure 5A:
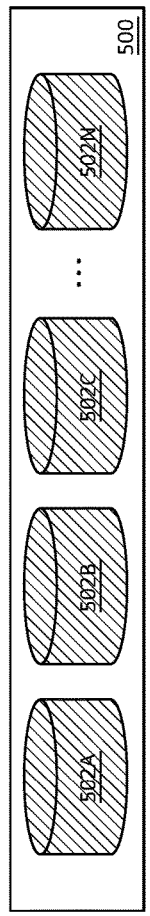
FIGS. 5A-5D illustrate a high level block diagram of a storage address space over time as a data scrub process according an embodiment of the present invention is applied.
Figure 5B:
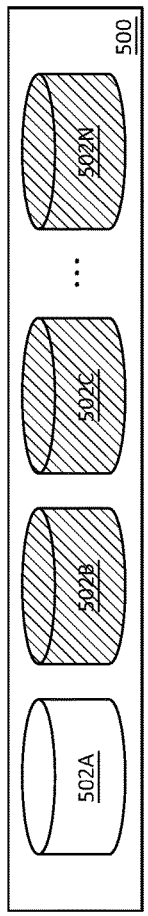
Figure 5C:
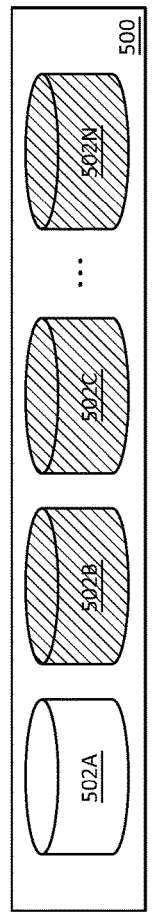
Figure 5D:
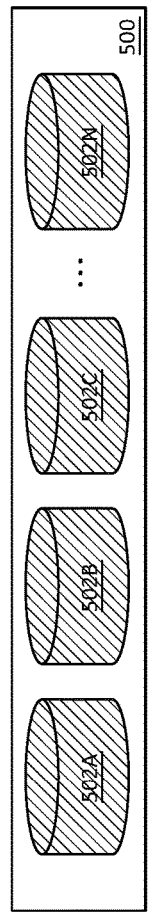

At a first time, T0, illustrated by FIG. 5A, logical volumes 502 are defined including a logical volume, 502A to be scrubbed. Each of logical volumes 502 of the illustrated embodiment may be associated or "mounted" with a higher level storage element (e.g., a TSM volume) and subsequently written to within one or more storage objects (e.g., files). At some subsequent time, T1, illustrated by FIG. 5B, a logical volume (502A) is selected for scrubbing and designated read-only. Thereafter, at a time, T2, illustrated by FIG. 5C, logical volume 502A is scrubbed as described herein. Once all data has been scrubbed, logical volume 502A may then be returned to read/write status such that modifications to the logical volume or its sub-components may resume at a time, T3, illustrated by FIG. 5D. Data may be "scrubbed" as described herein by mounting or otherwise gaining access to logical volume 502A in a "raw" (e.g., block-level) mode and validating (or validating and correcting) all portions of the data via a data scrub operation.

FIG. 6 illustrates a data processing system useable with one or more embodiments of the present invention. While a particular number and arrangement of elements has been illustrated with respect to data processing system 600 of FIG. 6, it should be appreciated that embodiments of the present invention are not limited to data processing systems having any particular number, type, or arrangement of components and so may encompass a wide variety of data processing system types, architectures, and form factors (e.g., network elements or nodes, personal computers, workstations, servers, or the like). Data processing system 600 of the illustrated embodiment includes a processor 602 coupled to a memory 604 using a communication medium (e.g., bus 606). Memory 604 may comprise any of a number of system memory-type storage elements such as random access memory (RAM), read-only memory (ROM), flash memory, and cache.

Data processing system 600 of the illustrated embodiment further comprises an input/output (I/O) interface 608 coupled to bus 606 to communicatively couple one or more I/O devices (not shown) to data processing system 600. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface). Although a single I/O interface 608 has been depicted in data processing system 600, additional I/O interfaces, each coupled to one or more exemplary I/O devices may be included.

Embodiments of the present invention may include software, information processing hardware, and various processing operations further described herein. The features and process operations of the present invention may be embodied in executable instructions embodied within a machine-readable medium such as memory 604, a storage device, a communication device or medium, or the like. A machine-readable medium may include any mechanism that provides (i.e., stores and/or transmits) data in a form readable by a machine (e.g., data processing system 600). For example, a machine-readable medium may include but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as processor 602, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

The present invention has been described in the context of fully functional data processing system; however, those skilled in the art will appreciate that the present invention is capable of being distributed as a program product in a variety of forms and of being applied equally, regardless of the particular type of machine-readable or signal-bearing media used to carry out the distribution. Examples of signal-bearing media include recordable media such as floppy disks and CD-ROM, transmission type media such as digital and analog communications links, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

The invention claimed is:

1. A method for scrubbing data in a storage element within a data storage subsystem, by a processor device, the method comprising:
   detecting an event in which utilization of the data storage subsystem has fallen below a dynamically adjusted threshold value;
   selecting a storage element from a plurality of storage elements within the data storage sub system;
   temporarily designating at least a portion of the selected storage element as "read-only" to temporarily suspend data modifications on the selected storage element while simultaneously maintaining read access to the selected storage element;
   performing a scrubbing operation on the selected storage element after the temporary designation, wherein the scrubbing operation automatically initiates when a quantity of active data to be scrubbed reaches a predetermined quantity threshold, the predetermined quantity threshold of active data comprising a total threshold number of bytes or blocks corresponding to a greatest frequency of access thereof; and
   in response to a completion of the scrubbing operation on the selected storage element, removing the temporary designation to resume data modifications on the selected storage element.

2. The method of claim 1, further comprising:
   performing data modifications on the storage element prior to selecting the storage elements; and
   resuming said data modifications in response to completing the scrubbing operation.

3. The method of claim 2, wherein the scrubbing operation comprises:
   selecting a frame of the selected storage element;
   identifying a frame check sequence (FCS) value of the selected frame;
   performing a cyclic redundancy check (CRC) on the selected frame to generate a CRC value; and
   determining if the CRC value equals the FCS value, wherein:
      if the CRC value and the FCS value are equal, selecting a next frame of the selected storage element, and
      if the CRC value and the FCS value are not equal, indicating an error on the selected frame and correcting the error by modifying an associated portion of metadata.

4. The method of claim 3, wherein he scrubbing operation further comprises:
   selecting a frame of the selected storage element;
   identifying a frame check sequence (FCS) value of the selected frame;

performing a cyclic redundancy check (CRC) on the selected frame to generate a CRC value; and dividing the CRC value into the FCS value to determine if a zero remainder is produced, wherein:

if the zero remainder is produced, selecting a next frame of the selected storage element, and if a non-zero remainder is produced, indicating an error on the selected frame and correcting the error by modifying an associated portion of metadata.

5. The method of claim 1, wherein the selecting comprises selecting the storage element including a largest number of active data.

6. The method of claim 1, wherein the selecting comprises selecting a most-frequently accessed storage element prior to selecting one or more less frequently accessed storage elements.

7. A physical, non-transitory machine-readable medium having a computer program product for scrubbing data in a storage element within a data storage subsystem, the computer storage medium comprising:

computer code for detecting an event in which utilization of the data storage subsystem has fallen below a dynamically adjusted threshold value;

computer code for selecting a storage element from a plurality of storage elements within the data storage subsystem;

computer code for temporarily designating at least a portion of the selected storage element as "read-only" to temporarily suspend data modifications on the selected storage element while simultaneously maintaining read access to the selected storage element;

computer code for performing a scrubbing operation on the selected storage element after the temporary designation, wherein the scrubbing operation automatically initiates when a quantity of active data to be scrubbed reaches a predetermined quantity threshold, the predetermined quantity threshold of active data comprising a total threshold number of bytes or blocks corresponding to a greatest frequency of access thereof; and computer code for, in response to a completion of the scrubbing operation on the selected storage element, removing the temporary designation to resume data modifications on the selected storage element.

8. The physical, non-transitory machine-readable medium of claim 7, wherein the computer code for selecting comprises computer code for selecting the storage element including a largest number of active data.

9. The physical, non-transitory machine-readable medium of claim 8, wherein the scrubbing operation comprises:

computer code for selecting a frame of the selected storage element;

computer code for identifying a frame check sequence (FCS) value of the selected frame;

computer code for performing a cyclic redundancy check (CRC) on the selected frame to generate a CRC value; and computer code for determining if the CRC value equals the FCS value, wherein:

if the CRC value and the FCS value are equal, selecting a next frame of the selected storage element, and if the CRC value and the FCS value are not equal, indicating an error on the selected frame and correcting the error by modifying an associated portion of metadata.

10. The physical, non-transitory machine-readable medium of claim 9, wherein the scrubbing operation further comprises:

computer code for selecting a frame of the selected storage element;

computer code for identifying a frame check sequence (FCS) value of the selected frame;

computer code for performing a cyclic redundancy check (CRC) on the selected frame to generate a CRC value; and computer code for dividing the CRC value into the FCS value to determine if a zero remainder is produced, wherein:

if the zero remainder is produced, selecting a next frame of the selected storage element, and if a non-zero remainder is produced, indicating an error on the selected frame and correcting the error by modifying an associated portion of metadata.

11. The physical, non-transitory machine-readable medium of claim 7, wherein the selecting comprises selecting a most-frequently accessed storage element prior to selecting one or more less frequently accessed storage elements.

12. A system for scrubbing data in a storage element within a data storage subsystem, the system comprising:

a plurality of storage elements;

a memory comprising a scrub module; and a processing device coupled to the plurality of storage elements and to the memory, wherein the processing device, when executing the scrub module, is configured for:

detecting an event in which utilization of the data storage subsystem has fallen below a dynamically adjusted threshold value;

selecting a storage element from the plurality of storage elements within the data storage sub system;

temporarily designating at least a portion of the selected storage element as "read-only" to temporarily suspend data modifications on the selected storage element while simultaneously maintaining read access to the selected storage element;

performing a scrubbing operation on the selected storage element after the temporary designation, wherein the scrubbing operation automatically initiates when a quantity of active data to be scrubbed reaches a predetermined quantity threshold, the predetermined quantity threshold of active data comprising a total threshold number of bytes or blocks corresponding to a greatest frequency of access thereof; and in response to a completion of the scrubbing operation on the selected storage element, removing the temporary designation to resume data modifications on the selected storage element.

13. The system of claim 12, wherein the scrub module is further configured for:

performing data modifications on the storage element prior to selecting the storage elements; and resuming said data modifications in response to completing the scrubbing operation.

14. The system of claim 13, wherein initiating the scrubbing operation causes the processing device to perform the scrubbing operation by:

selecting a frame of the selected storage element;

identifying a frame check sequence (FCS) value of the selected frame;

performing a cyclic redundancy check (CRC) on the selected frame to generate a CRC value; and determining if the CRC value equals the FCS value, wherein:
  if the CRC value and the FCS value are equal, selecting a next frame of the selected storage element, and
  if the CRC value and the FCS value are not equal, indicating an error on the selected frame and correcting the error by modifying an associated portion of metadata.

15. The system of claim 14, wherein initiating the scrubbing operation causes the processing device to further perform the scrubbing operation by:
  selecting a frame of the selected storage element;
  identifying a frame check sequence (FCS) value of the selected frame;
  performing a cyclic redundancy check (CRC) on the selected frame to generate a CRC value; and
  dividing the CRC value into the FCS value to determine if a zero remainder is produced, wherein:
    if the zero remainder is produced, selecting a next frame of the selected storage element, and
    if a non-zero remainder is produced, indicating an error on the selected frame and correcting the error by modifying an associated portion of metadata.

16. The system of claim 12, wherein, when selecting, the processing device is configured for selecting the storage element including a largest number of active data.

17. The system of claim 12, wherein, when selecting, the processing device is configured for selecting a most-frequently accessed storage element prior to selecting one or more less frequently accessed storage elements.

* * * * *